United States Patent
Holdt

[15] 3,680,531
[45] Aug. 1, 1972

[54] AUTOMATIC BOILER BLOWDOWN CONTROL

[72] Inventor: Donald H. Holdt, Cambridge, Md.

[73] Assignee: Chemed Corporation, Cincinnati, Ohio

[22] Filed: April 22, 1971

[21] Appl. No.: 136,369

[52] U.S. Cl. ..............................122/379, 122/382
[51] Int. Cl. ..............................................F22b 37/54
[58] Field of Search.............................122/379, 382

[56] References Cited

UNITED STATES PATENTS 3,139,071  6/1964  Rivers..........................122/382
3,377,994  4/1968  Horne...........................122/382
3,512,507  5/1970  Dixon...........................122/382

Primary Examiner—Kenneth W. Sprague
Attorney—William W. McDowell, Jr. and Kenneth E. Prince

[57] ABSTRACT

A system for the control of solutes and suspended solids in boiler water which periodically samples the conductivity of boiler water in a cell located outside of the boiler walls. High conductivity opens the blowdown valve and allows fresh feed to enter until the conductivity drops to pre-determined levels. Low conductivity, usually indicating leaks and wasted boiler water, activates an alarm.

5 Claims, 6 Drawing Figures

INVENTOR
Donald H. Holdt

INVENTOR
Donald H. Holdt

BY *William W. McDowell Jr*
ATTORNEY

AUTOMATIC BOILER BLOWDOWN CONTROL

This invention relates to a blow-down control and concentration sampling system for boilers which will maintain an approximately constant conductivity in the boiler water.

The difficulties inherent in operating a boiler are well known. The makeup or "feed" water for steam-generating boilers is never pure water. It may contain salts such as calcium or magnesium which contribute to water hardness; it may contain dissolved oxygen which in hot boiler water causes pitting and corrosion of the boiler walls; it may even contain small quantities of suspended solids which frequently cause foaming and entrainment of water in the issuing steam. The continued operation of a boiler equipped with a condensate return causes the concentration of dissolved salts and the other substances in the water to build up to undesirable degrees. Even if excessive scaling does not occur, the buildup of salts in the water and the scale on the boiler surfaces, if allowed to continue, lead to the loss of heat transfer efficiency through the boiler walls, and often cause the rapid corrosion of metal.

To avoid this condition, it is customary to "blowdown" a boiler intermittently and allow the water inside the boiler to be replaced by makeup water which in the boiler dilutes the concentration of salts or solids.

Dissolved oxygen, some solids, and calcium and magnesium hardness can be controlled by the treatment of feed water by chemical additions which, to a considerable degree, neutralize the undesirable conditions of the raw feed. Nevertheless, all of the above effects occur when the boiler remains in operation with returning condensate unless the concentration of undesirable matter in the boiler water is maintained within rather narrow limits.

The apparatus which is the subject of this invention maintains those limits automatically. It will operate on any boiler which is equipped with a blowdown outlet. For best control, and particularly for the control of foam-forming solids, attachment to the "skimmer" blowdown outlet of a boiler is preferred.

The unique features of this system are that the conductivity of the boiler water is determined at substantially boiler water temperature, and the conductivity measurements made at these temperatures are accurate. Secondly, the "point" at which the conductivity measurements are taken is outside of the boiler walls. Accordingly, should the probes need replacement, shutdown and draining of the boiler is not required. Thirdly, since measurements may be taken at boiler temperatures, no cooling coils or associated cooling equipment are demanded.

FIG. 1 is a logic diagram showing the steps in operation and the alternate results of high or low conductivity.

FIGS. 2a, 2b and 2c, taken together, show a conventional wiring diagram showing one arrangement of electrical components by which the series of steps outlined in Fig. 1 may be accomplished.

The control apparatus is located in the blowdown line and is entirely external to the boiler itself. This greatly simplifies the maintenance of the control, since no unvalved opening into the boiler is required.

Figure 1:
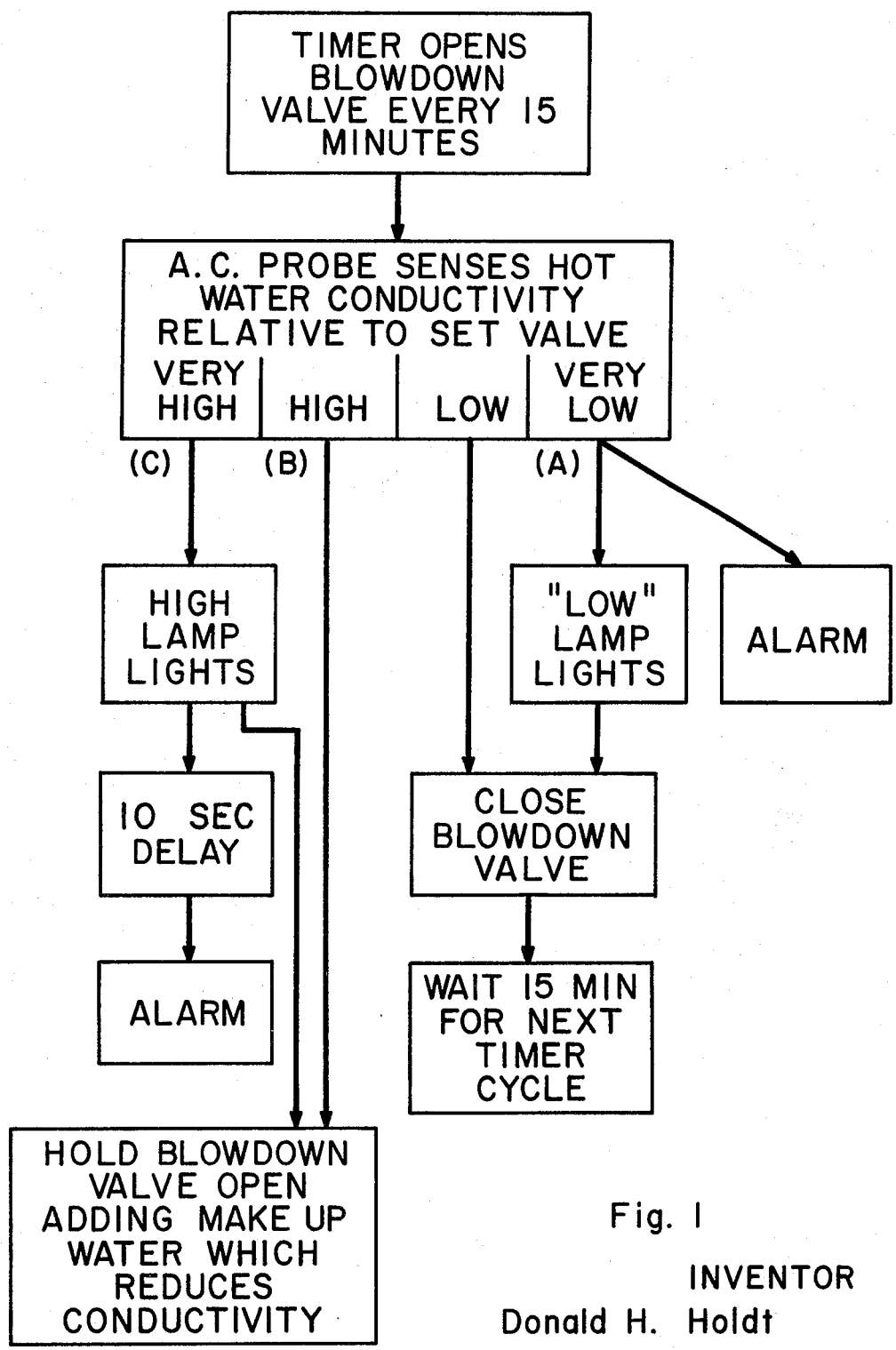

The time motor 11 operates continuously. It causes its associated switch 12 to close for approximately one minute out of each 15 minutes. This starts a series of operations best illustrated by the logic diagram (Fig. 1). The AC probe assembly 17 becomes flooded with boiler water just as soon as the solenoid valve 13 opens, and allows flow through the blowdown line 20.

If the probe, as normally is the case, finds the conductivity high, the operation as shown on the diagram is to hold the blowdown valve 13 open and allow makeup water to enter the boiler 30. This reduces the boiler water conductivity.

As soon as the conductivity in the boiler water drops to the set value, the solenoid blowdown valve 13 closes. However, there may be cases when the conductivity of the boiler water becomes very high. In this case, an alarm lamp 14 is lighted and after a ten-second delay an alarm bell 15 is rung. If on the other hand, the conductivity of the boiler water is very low, an alarm bell and a warning light 16 are simultaneously activated. The very high indications mean that the orifice in the solenoid-operated blowdown valve 13 may be too small and not allow the escape of sufficient water in the necessary time. It may also mean that the supply source has been contaminated and its conductivity raised to well above the set point. Should the indication be that the conductivity is very low, say 20 percent of the set value, the blowdown valve 13 closes. The trouble in this case is usually caused by a leaking blowdown valve.

Normally, however, with a water supply of reasonably constant composition such as may be found in municipal supplies, and when the orifice in the blowdown valve has the proper opening, this apparatus will continue to operate for months at a time and prevent any excessive buildup in the boiler.

The probe in probe assembly 17 since it operates on alternating current and draws a significant amount of energy, is free from "the polarization effects" which come about in D.C. operation by hydrogen gas collecting and bubbling off one electrode. The immediate conversion of the voltage developed across the probe to direct current through the bridge circuit 18 allows highly accurate measurement and eliminates many of the difficulties, particularly phase shifting, which arise when all alternating current operation of the entire apparatus is attempted.

Figure 2A:
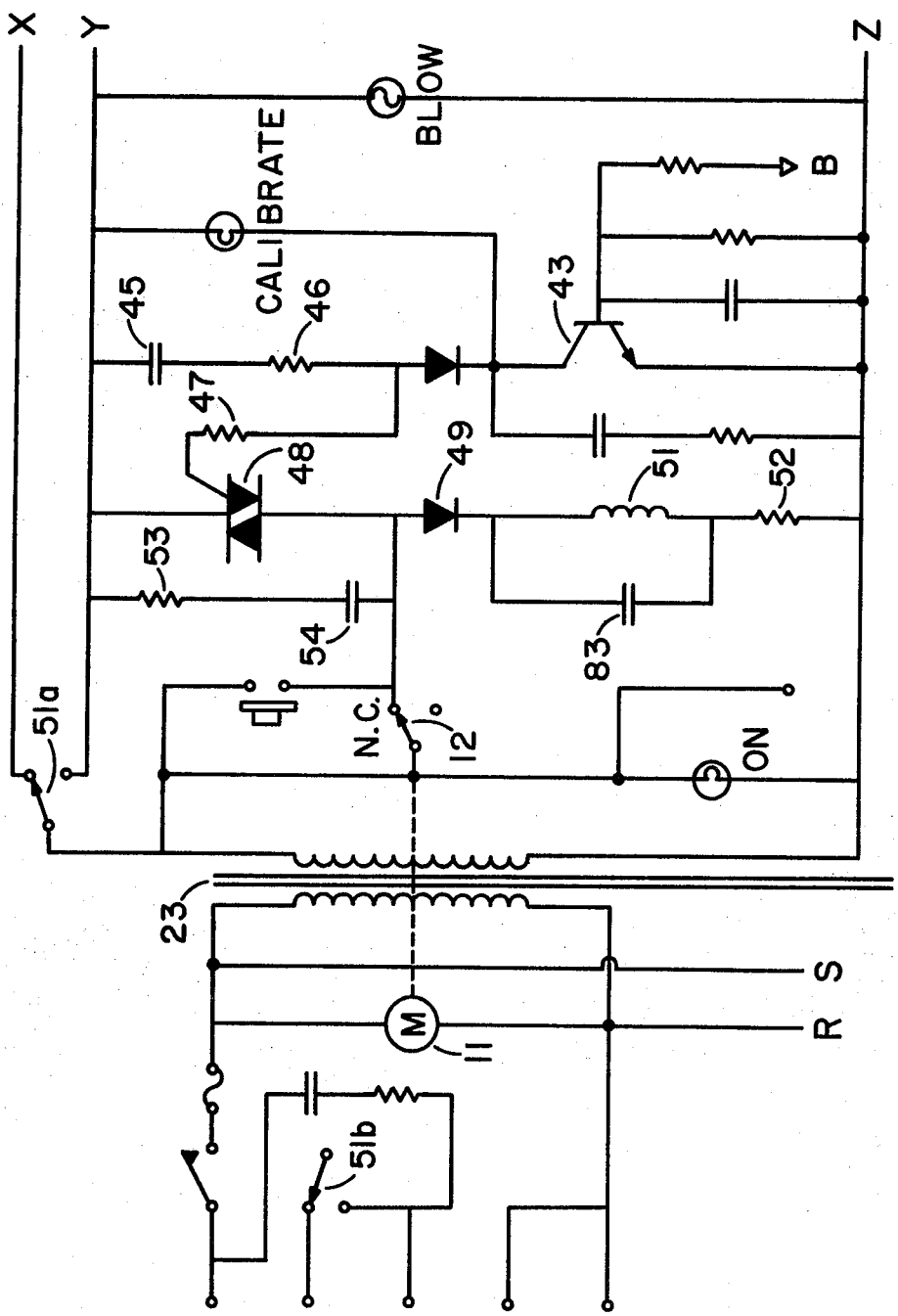
Figure 2B:
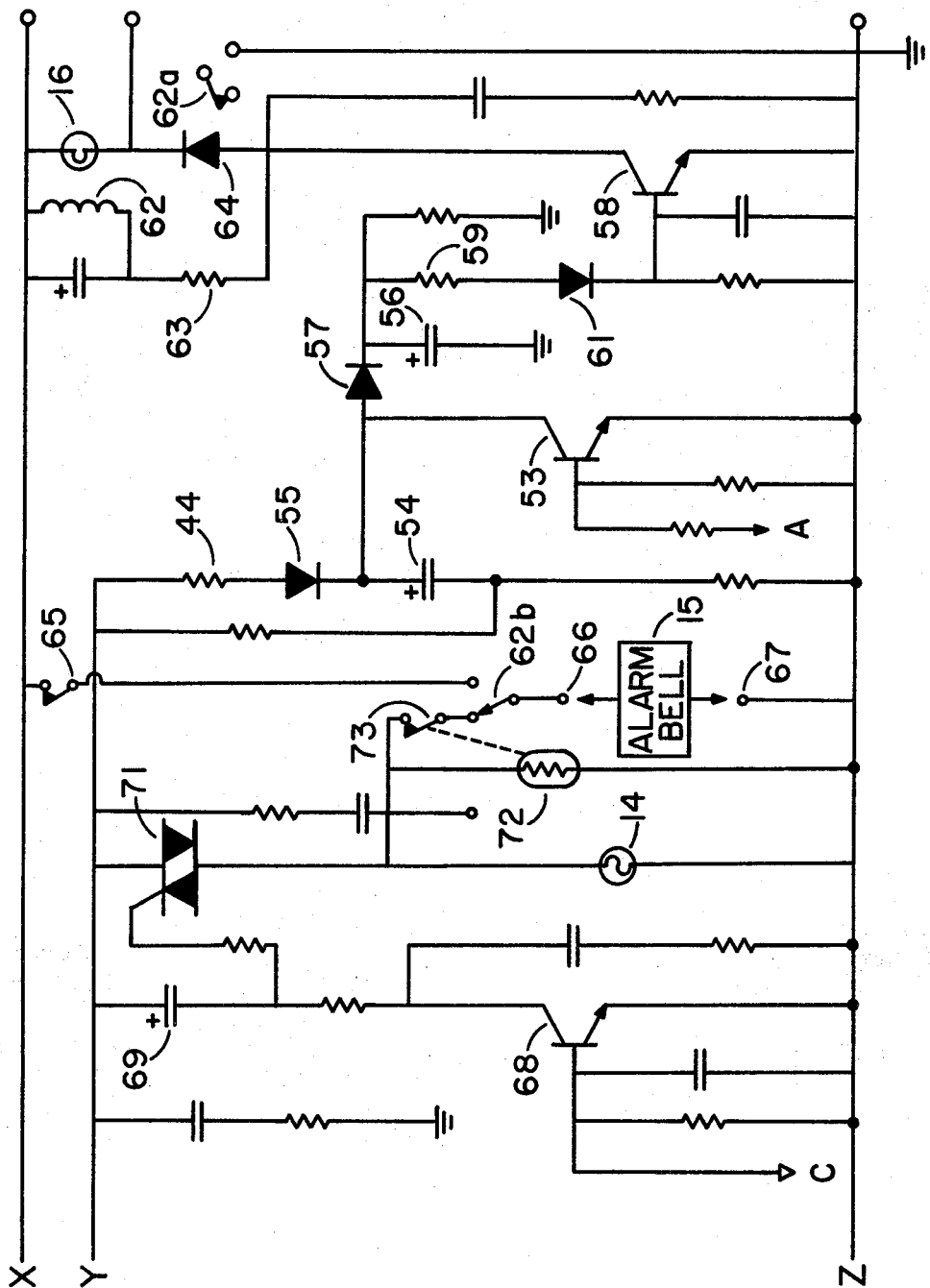
Figure 2C:
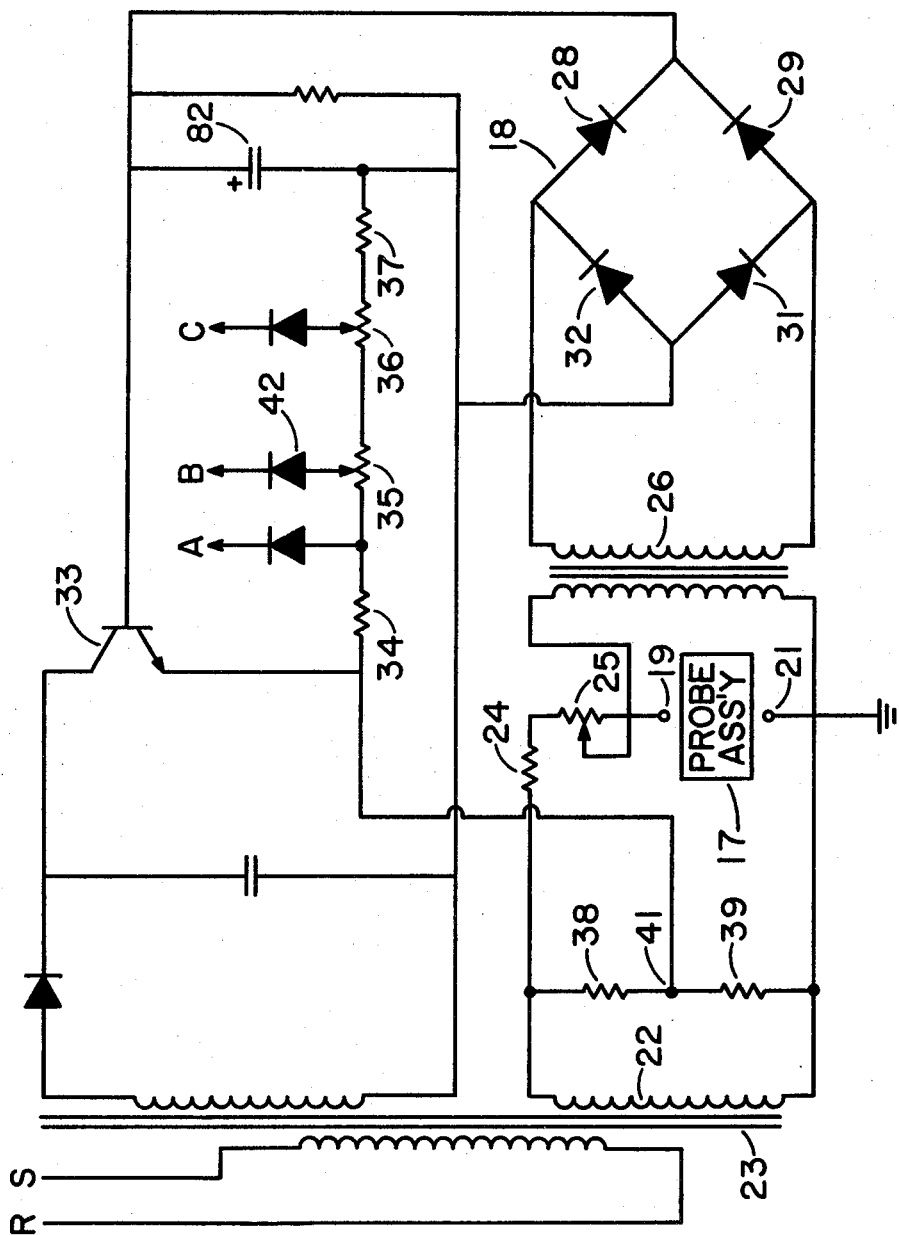

The circuit diagram shown in FIGS. 2a, 2b and 2c is a non-limiting example of one way in which these successive steps which achieve control of solids concentration in the boiler can be accomplished. The overall circuit diagram illustrated is obtained by connecting the elements of FIG. 2a to the elements of FIG. 2b at the breakpoints X, Y and Z in each of these two figures, and by connecting the elements of FIG. 2c to the elements of FIG. 2a at the breakpoints R and S in each of the latter two Figures. It is well understood that there are numerous electrical components and circuit arrangements which produce essentially identical operative results and such rearrangements are included within the scope of this invention.

Figure 3:
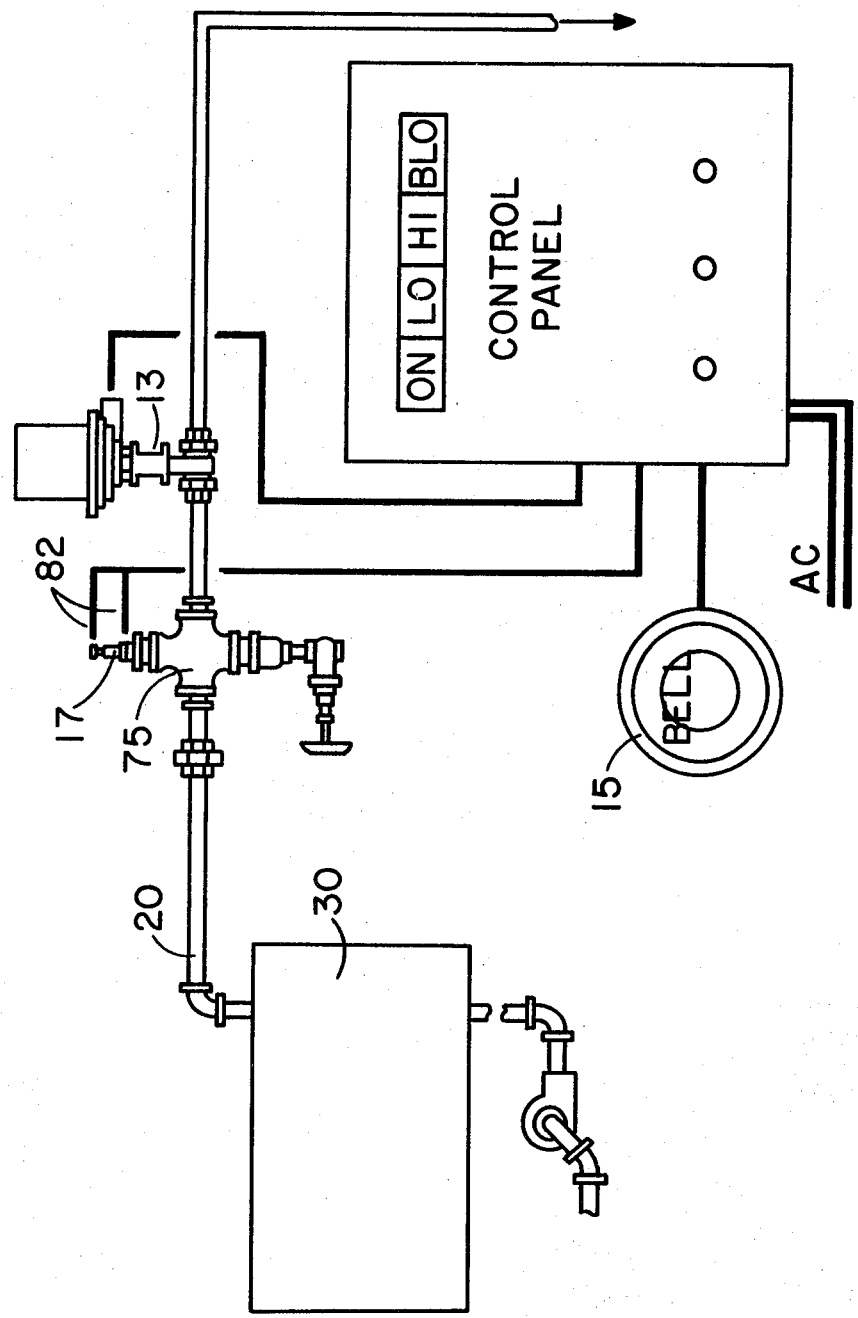
FIG. 3 is a schematic diagram showing the relation of the blowdown control and automatic conductivity sampling device to the boiler.

A brief description of the circuit operation follows: an alternating current voltage is applied across the terminals of the probe in probe assembly 17 which, as shown in Fig. 3, is located within 6 feet of the boiler downstream in the blowdown line. The voltage across the probe terminals 19 and 21 is supplied by a winding 22 on the transformer 23 through the resistor 24 and the variable resistor 25. By adjusting resistor 25 the "set point" may be established. The voltage delivered across the probe terminals 19 and 21 when flooded by boiler water is stepped up through the transformer 26 and then is applied to the full wave rectifier 18 which consists of the diodes 28, 29, 31 and 32.

The output of the rectifier 18 is then applied to the base of the transistor 33 which is connected as an emitter follower. The circuit decreases the loading on rectifier 18 hence a direct current voltage is delivered across resistors 34, 35, 36 and 37 which is proportional to the alternating current voltage between probe terminals 19 and 21 which in turn reflects the conductivity of the hot boiler water. As this conductivity increases, the direct current voltage across the resistor network decreases. Resistors 38 and 39 are connected across the same winding 22 which energizes the probe sensing circuit. One end of the resistor 39 is grounded. Accordingly, the alternating current voltage at the junction 41 of resistors 38 and 39 is referred back to ground through resistor 39. Consequently, the direct current voltage developed across the resistor network 34, 35, 36 and 37 remains above ground potential by the A.C. voltage developed across resistor 39.

The output from the diode 42 is connected to the base of transistor 43. If the base goes positive with respect to ground, transistor 43 conducts. The arrow end of diode 42 is connected to the adjustable resistor 35. This point normally is negative with respect to the junction 41. Whenever the D.C. voltage across resistor 34 or 35 is less than the peak A.C. voltage across resistor 39, tie-point B will go positive with respect to ground. Whenever this happens, transistor 43 will conduct on every half cycle.

The conduction of transistor 43 causes capacitor 45 to become charged through resistor 46. Capacitor 45 then discharges through resistors 46 and 47 which causes the triac 48 to turn on. When the triac fires, it applies an A.C. voltage on diode 49 and across relay 51 and resistor 52. The relay is now energized.

Resistor 53 and capacitor 54 which shunt the triac 48 form a suppressor circuit to damp transients. As the relay 51 is energized, its contacts 51a remain in the energized position as also do contacts 51b. Contacts 51b control the solenoid blowdown valve 13 in the blowdown line.

As the conductivity of the water in the boiler measured across the terminals 19 and 21 decreases because of dilution by makeup water, the voltage across terminals 19 and 21 increases. This results in an increase in the DC voltage across the resistors 34 and 35. Whenever this DC voltage exceeds the peak AC voltage across resistor 39, transistor 43 no longer will conduct every half cycle. The charge across capacitor 45 will be dissipated and triac 48 will shut off. This causes the relay 51 to open and contacts 51a and 51b will return to the position shown in Fig. 2. The closing of contact 51b causes the solenoid valve 13 to close. Contacts 51a energize, indicating circuits which will be described later.

As stated, the timer motor 11 operates continuously and causes the switch 12 to assume the normally closed position one minute out of every 15. This is the sampling period. The closing of switch 12 applies voltage to the diode 49, to the coil of relay 51 and to the resistance 52. Relay 51 consequently closes. This in turn closes the contacts 51a and 51b. The contact made by 51b causes the solenoid (or motorized) valve 13 to open and allows a quantity of water to flow past the probe. Depending upon the conductivity determined by the probe in probe assembly 17, transistor 43 may or may not conduct. If transistor 43 does not conduct and the timer motor 11 has opened its switch 12, relay 51 is de-energized. The blowdown valve 13 then closes through its circuit which is completed through the contacts of 51b. The other contact 51a reverts to the position shown in Fig. 2.

The points A and C are connections to alarm circuits which indicate when the conductivity of the water is significantly below the desired value or is above the set value. The alarm is accomplished be picking off different DC potentials from the resistor network 34, 35, 36 and 37. The point A gives an indication whenever the conductivity of the boiler water is considerably less than the set point established by variable resistor 25. Whenever the DC voltage across resistor 34 increases to a value which the peak AC voltage developed across resistor 39 then the transistor 53 will not conduct. Then when the contacts 51a assume the energized position, capacitor 54 is charged through resistor 44 and diode 55. Normally the charge on capacitor 54 is kept extremely low because transistor 53 conducts. 51a As the capacitor 54 charges, the charge is transferred to capacitor 56, through diode 57. This action applied a positive voltage to the collector of transistor 58. This charge is transferred to capacitor 56, through diode 57, which then applies a positive voltage to the collector of transistor 58, through resistor 59 and diode 61. This charge is sufficient to cause transistor 58 to conduct. However, no collector voltage is applied to transistor 58 at this point because the contacts 51a of the relay are in the energized position and remove voltages from the collector of transistor 58 via the coil of relay 62 and resistance 63.

As soon as the contacts 51a assume their normally closed position the charge on capacitor 56 becomes sufficient to keep transistor 58 conducting for a time sufficient to energize the coil of relay 62. At this moment contacts 62a close, which causes the relay 62 to be locked across the line by current flowing through the resistor 63 and across diode 64. This causes the low alarm light to be lighted. If switch 65 is closed, the alarm bell 15 which is connected via contacts 62b across terminals 66 and 67 will ring. Switch 65 is an alarm silencing switch which is effective only in the case of low conductivities.

In the other condition, when the conductivity of the water flowing through the blowdown line is high when compared with the set point, not only is point B going positive with respect to ground, but also point C. Since point B is going positive, this means that the relay 51 will remain energized whenever it becomes energized as a result of the sampling cycle of the motor timer 11.

In addition, transistor 68 conducts because the point C is going positive with respect to ground. Transistor 68 then causes capacitor 69 to charge. This causes the triac 71 to fire. The firing of triac 71 lights the high light 14 and energizes the timed relay 72. After about 10 seconds, relay 72 closes its contact 73 and will ring the alarm bell 15 through contacts 62b.

Figure 4:
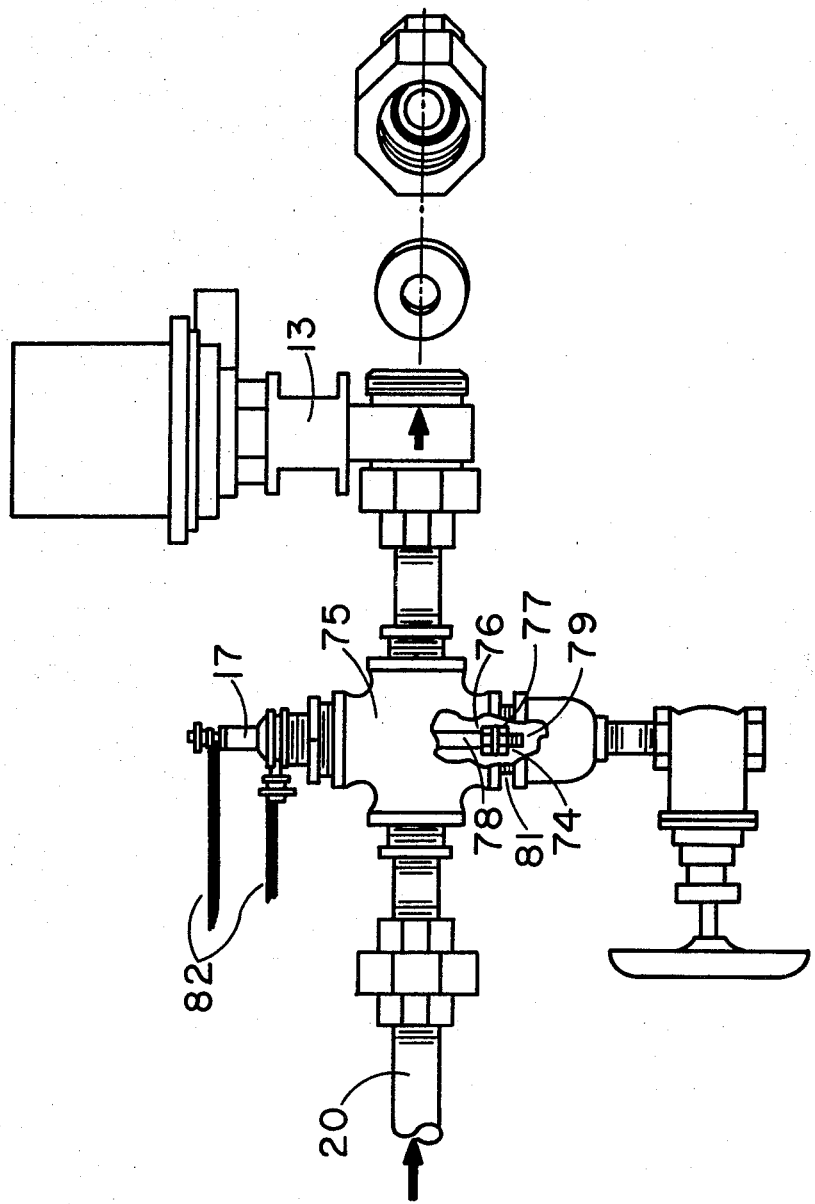
FIG. 4 is an elevation of the conductivity cell and the motorized ball valve controlling the blowdown. The breakaway shows the position of the probe electrode in relation to the axis of the blowdown line.

When the motorized valve opens and permits water and steam to flow through the blowdown line, the sudden drop in pressure causes steam bubbles to expand as they pass through the piping. If bubbles pass the probe, there is danger of fluttering and inaccurate determinations. The probe assembly 17, as shown in detail in FIG. 4, in large degree prevents such bubbles from coming in contact with the actual electrical path across the two electrodes of the probe.

One terminal 74 of the probe reaches downwardly to extend slightly below the lowermost extent of the cross 75. The probe is insulated down to the point 76. The nuts 77 hold the insulating sleeve 78 in position. The potential drop representing the conductivity of the boiler water thus appears between the tip portion 79 of the probe and the nuts 77 and the wall of the cross 75 and the nipple 81. Appropriate electrical leads 82 carry this potential drop measurement to terminals 19 and 21 in the circuit shown in FIG. 2.

The larger bubbles, since they are far lighter than the water, travel along the upper area of the blowdown pipe. Water fills the lower area. The large bubbles which would seriously disturb the readings do not come in contact with the critical measurement space at the bottom of the probe assembly. This arrangement eliminates the need for cooling the blowdown water or rather a sample of the blowdown water, prior to determining its conductivity, and makes it possible to have a simple continuously operating sampling device.

Secondly, the small entrained bubbles which are distributed in the water and which rapidly pass out of the pipe, do not affect the measurement because any alarm or valve operating action is slowed down by the delay circuits that are built into the wiring system. These delays actually are an integrating circuit consisting of the condenser 82 (FIG. 2) and the source impedance of diode 49 and the time constants involved in the relays such as that in the coil of relay 51 and the shunt capacitor 83.

The normal experience is that this apparatus will function for long periods of time without attention, but should leaks occur, or boiler water suddenly contain more solids than is normal, it will call the attention of the operator to an undesirable or a dangerous condition and signal for its immediate correction.

The automatic control of makeup water in the above-described system is accomplished by well-known boiler water makeup controls and is not part of the present invention.

WHAT IS CLAIMED IS:

1. The method of controlling the concentration of dissolved and suspended matter in boiler water which includes repetitively sampling for about one minute at approximately 15-minute intervals the said water by opening the boiler blowdown valve, causing the hot water released by said valve to flow through a conductivity cell, impressing an alternating electric current across the electrodes of said cell, converting the current flowing between the said electrodes to a unidirectional current and causing the said unidirectional current to hold the blowdown valve open for times determined by the conductivity of the boiler water as sensed by the probe.

2. In combination with a steam boiler having a blowdown line and a makeup water connection, means to maintain within the boiler the conductivity of the water between pre-determined limits comprising a valve located in said blowdown line in proximity to the boiler, a motorized switch having a repetitive time cycle arranged to open the said valve for a time approximating one-fifteenth of the time cycle of operation, a conductivity cell inserted in the blowdown line between the boiler and said valve and having electrodes exposed to water flowing through said cell, means to impose an alternating current on the cell electrodes, means to rectify the current passing between the said electrodes, a rectifier and electrical circuit means responsive to the rectified current to close the blowdown valve should the conductivity of the boiler water be found to lie within the predetermined limits and alternatively to keep the valve open if the conductivity of the boiler water exceeds the said limits until dilution of the boiler water from the said makeup feed reduces the conductivity to acceptable limits and thereafter to close the said blowdown valve.

3. The apparatus as claimed in claim 2 wherein the said blowdown valve is located in the skimmer blowdown line positioned within 6 feet exteriorally of the boiler whereby when the valve is opened, measurement of the conductivity of the boiler water occurs at temperatures approximately equal to the temperature of the water inside the boiler.

4. Apparatus according to claim 2 wherein the production of false signals is avoided by inserting in the electrical circuits controlling the operation, electrical delay networks adjusted to allow time for entrained bubbles in the blowdown water to pass the said electrodes and move out of the blowdown measurement zone and thereby avoid activation of the said blowdown valve by a false signal.

5. The apparatus according to claim 2 wherein the conductivity cell is arranged to measure the conductivity of the boiler water only at a point below the invert of the blowdown pipe, to minimize the possibility of bubbles giving false signals to the said blowdown control.

* * * * *

Disclaimer 3,680,531.—*Donald H. Holdt*, Cambridge, Md. AUTOMATIC BOILER BLOWDOWN CONTROL. Patent dated Aug. 1, 1972. Disclaimer filed Nov. 10, 1975, by the assignee, *Chemed Corporation*.

Hereby enters this disclaimer to all claims of said patent.

[*Official Gazette February 10, 1976.*]